United States Patent
Oshita et al.

(10) Patent No.: US 7,510,501 B2
(45) Date of Patent: Mar. 31, 2009

(54) HYDRAULIC CONTROL SYSTEM OF BELT-TYPE CONTINUOUSLY VARIABLE TRANSMISSION FOR VEHICLE

(75) Inventors: Hideki Oshita, Fuji (JP); Hiroyasu Tanaka, Fuji (JP); Takuichiro Inoue, Fuji (JP); Masahiro Yamamoto, Fuji (JP); Kousuke Abe, Fuji (JP)

(73) Assignee: JATCO Ltd (JP)

( * ) Notice: Subject to any disclaimer, the term of this patent is extended or adjusted under 35 U.S.C. 154(b) by 903 days.

(21) Appl. No.: 11/092,537

(22) Filed: Mar. 29, 2005

(65) Prior Publication Data
US 2005/0221930 A1 Oct. 6, 2005

(30) Foreign Application Priority Data
Mar. 31, 2004 (JP) ............................. 2004-108199

(51) Int. Cl.
*F16H 61/664* (2006.01)
(52) U.S. Cl. ........................................................ 477/43
(58) Field of Classification Search .................. None
See application file for complete search history.

(56) References Cited

U.S. PATENT DOCUMENTS

| | | | |
|---|---|---|---|
| 4,764,156 A | 8/1988 | Ohkumo | |
| 6,050,917 A | 4/2000 | Gierling et al. | |
| 6,168,546 B1 | 1/2001 | Löffler et al. | |
| 6,595,896 B1 | 7/2003 | Gierling | |
| 7,006,908 B2 | 2/2006 | Kang et al. | |
| 7,029,410 B2 | 4/2006 | Sawada et al. | |
| 7,065,441 B2 | 6/2006 | Yamamoto et al. | |
| 7,140,991 B2 * | 11/2006 | Sawada et al. | 474/28 |
| 7,179,196 B2 * | 2/2007 | Oshita et al. | 477/46 |
| 2001/0023216 A1 | 9/2001 | Bolz et al. | |
| 2002/0004437 A1 | 1/2002 | Asayama et al. | |
| 2002/0173390 A1 | 11/2002 | Sommer et al. | |
| 2004/0133318 A1 | 7/2004 | Kang et al. | |
| 2004/0171444 A1 | 9/2004 | Yamamoto et al. | |
| 2004/0209719 A1 | 10/2004 | Ochiai et al. | |

(Continued)

FOREIGN PATENT DOCUMENTS

DE 19712451 A1 10/1998

(Continued)

OTHER PUBLICATIONS

Relevant Portion of European Search Report issued in corresponding European Patent Application No. 05251445.2-2421, dated Jun. 12, 2007.

(Continued)

*Primary Examiner*—Dirk Wright
(74) *Attorney, Agent, or Firm*—Rossi, Kimms & McDowell LLP

(57) ABSTRACT

When gear ratio is abnormally increased due to failure of a secondary pulley rotation sensor or slip in a V belt, demand torque of an engine is rapidly reduced, and after upper limit regulation of a target secondary pulley pressure is performed for a second predetermined time, control of the target secondary pulley pressure according to an output torque of the engine is performed. Thereby, since an actual torque of the engine does not exceed a belt capacity capable of holding a belt by a secondary pulley pressure which is actually generated, when the secondary pulley rotation sensor fails, no slip occurs in the V belt.

3 Claims, 4 Drawing Sheets

U.S. PATENT DOCUMENTS

2005/0192153 A1 9/2005 Jozaki et al.
2005/0221929 A1 10/2005 Oshita et al.

FOREIGN PATENT DOCUMENTS

| DE | 19712713 A1 | 10/1998 |
| DE | 19858263 A1 | 6/2000 |
| DE | 10111830 A1 | 9/2002 |
| DE | 10200400763 A1 | 9/2004 |
| EP | 0 228 884 A1 | 7/1987 |
| EP | 1158216 A2 | 11/2001 |
| EP | 1400728 A2 | 3/2004 |
| EP | 1 468 862 A2 | 10/2004 |

OTHER PUBLICATIONS

Search Report issued in the corresponding European application No. 052514411.4-1254, dated Jun. 19, 2007.

Search Report issued in the co-pending U.S. Appl. No. 11/092,044 and co-pending European application No. 05251616.8-2421, dated Jul. 4, 2007.

Specification and Claims of related co-pending U.S. Appl. No. 11/092,037.

Specification and Claims of related co-pending U.S. Appl. No. 11/092,044.

* cited by examiner

HYDRAULIC CONTROL SYSTEM OF BELT-TYPE CONTINUOUSLY VARIABLE TRANSMISSION FOR VEHICLE

BACKGROUND OF THE INVENTION

1. Field of the Invention

The present invention relates to a hydraulic control system for controlling hydraulic pressure that is supplied to pulleys provided in a belt-type continuously variable transmission for a vehicle.

2. Description of the Prior Art

Conventionally, as an example of continuously variable transmissions suitable for a vehicle, there is a belt-type continuously variable transmission wherein a V-belt is wound between a primary pulley and a secondary pulley.

Generally, in these continuously variable transmissions, a hydraulic pressure (hereinafter, primary pulley pressure) obtained by regulating a line pressure as an original pressure with a shift control valve is supplied to a cylinder chamber of the primary pulley, and a hydraulic pressure (hereinafter, secondary pulley pressure) obtained by reducing the line pressure as the original pressure with a pressure reducing valve is supplied to a cylinder chamber of the secondary pulley. The primary pulley pressure is increased or reduced with the shift control valve to change the groove width of the primary pulley, and radius ratio of the primary pulley and the secondary pulley is changed, whereby gear ratio (reduction ratio) of the vehicle such as an automobile is continuously controlled.

Rotation sensors detecting rotation speed of the pulleys are respectively provided in the primary pulley and the secondary pulley, and an actual gear ratio of the belt-type continuously variable transmission is calculated by calculating a ratio of the rotation speeds detected with these rotation sensors.

When trouble such as breaking occurs in a secondary pulley rotation sensor detecting rotation speed of the secondary pulley, a gear ratio calculated on the basis of the rotation speeds detected by the rotation sensors is abnormally increased (changed to a low speed side).

In this case, since it cannot be determined whether the gear ratio has been abnormally increased due to a slip that occurs in the V-belt wound around the respective pulleys, or whether the gear ratio has been abnormally increased due to the failure of the secondary pulley rotation sensor, the secondary pulley pressure is rapidly reduced, and further a demand torque to an engine is reduced according to the secondary pulley pressure which is reduced.

However, in the above conventional device, an actual torque of the engine cannot be reduced according to the secondary pulley pressure that is rapidly reduced, so that when the above control of hydraulic pressure is performed due to the failure of the secondary pulley rotation sensor, the actual torque of the engine exceeds a belt capacity capable of holding the V-belt by the secondary pulley pressure in the process wherein hydraulic pressure is reduced, and an actual belt slip occurs due to short of the belt capacity.

SUMMARY OF THE INVENTION

The present invention has been made in view of the aforementioned problem, and its object is to provide a hydraulic control system in a belt-type continuously variable transmission in which no belt slip occurs even if a secondary pulley rotation sensor fails.

The present invention provides a hydraulic control system of a belt-type continuously variable transmission for a vehicle in which a belt is wound between a primary pulley to which power from an engine controlled by an engine controller is inputted and a secondary pulley of an output side, and a transmission controller calculates a target primary pulley pressure acting on the primary pulley and a target secondary pulley pressure acting on the secondary pulley so that an actual gear ratio of these pulleys which is obtained on the basis of a rotation speed of the primary pulley detected by a primary pulley side rotation detecting section and a rotation speed of the secondary pulley detected by a secondary pulley side rotation detecting section becomes a target gear ratio, wherein when the actual gear ratio is increased to a predetermined gear ratio or higher, the transmission controller commands reduction of an output torque of the engine to the engine controller and controls the target secondary pulley pressure to a value corresponding to the output torque of the engine after a predetermined time elapses from the command of the reduction of the output torque of the engine.

According to the present invention, when the actual gear ratio is increased to the predetermined gear ratio or higher, the output torque of the engine is reduced, and after the predetermined time elapses from the command of the output torque reduction of the engine, the target secondary pulley pressure is controlled according to the output torque of the engine. Therefore, when the secondary pulley rotation sensor fails the actual torque of the engine does not exceed the belt capacity capable of holding the belt by the secondary pulley pressure actually generated, and no slip occurs in the belt.

The above and further objects and features of the invention will be more fully apparent from the following description when the same is considered with reference to the accompanying drawings.

DETAILED DESCRIPTION OF THE PREFERRED EMBODIMENT

A preferred embodiment of the present invention will be described hereinbelow.

Figure 1:
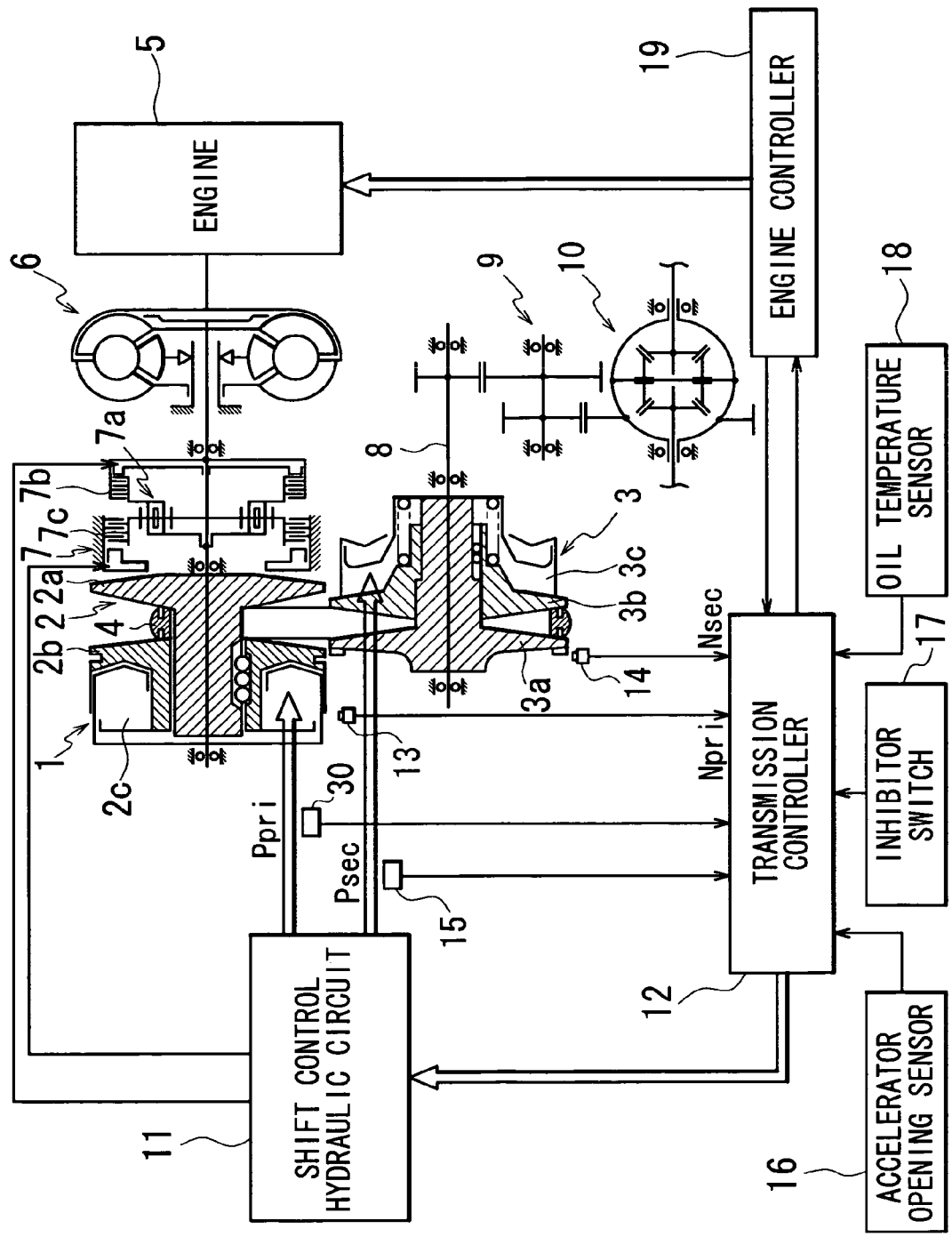
FIG. 1 is a view showing an embodiment according to the present invention.

FIG. 1 schematically shows a construction of a V-belt type continuously variable transmission.

A primary pulley 2 and a secondary pulley 3 are arranged so that their V-shaped grooves are aligned, and a V-belt 4 is wound around the V-shaped grooves of the pulleys 2, 3. An engine 5 that is a driving source is arranged coaxially with the primary pulley 2, and a torque converter 6 having a lockup mechanism and a forward/reverse switching mechanism 7 are sequentially provided between the engine 5 and the primary pulley 2 in a direction from the engine 5 to the primary pulley 2. The torque converter 6, the forward/reverse switching mechanism 7, the primary pulley 2, the secondary pulley 3 and the V-belt 4 forms a V-belt type continuously variable transmission 1.

The forward/reverse switching mechanism 7 is comprised mainly of a double-pinion planetary gear set 7a. A sun gear of the double-pinion planetary gear set 7a is connected through the torque converter 6 to the engine 5, and a carrier of the double-pinion planetary gear set 7a is connected to the primary pulley 2. The forward/reverse switching mechanism 7 has a forward clutch 7b directly connecting the sun gear and the carrier of the double-pinion planetary gear set 7a and a backward brake 7c capable of fixing a ring gear. And the forward/reverse switching mechanism 7 transmits input speed, which is transmitted through the torque converter 6 from the engine 5, to the primary pulley 2 when the forward clutch 7b is engaged. Further, when the backward brake 7c is engaged, the forward/reverse switching mechanism 7 reverses and reduces an input speed transmitted through the torque converter 6 from the engine 5 and transmits this input speed to the primary pulley 2.

Rotation of the primary pulley 2 is transmitted through the V-belt 4 to the secondary pulley 3, and then rotation of the secondary pulley 3 is transmitted through an output shaft 8, a gear set 9 and a differential gear 10 to not-shown wheels.

In order to make it possible to change a rotation transmission ratio (gear ratio) between the primary pulley 2 and the secondary pulley 3 during the above-mentioned power transmission, one of flanges constituting the V-shaped grooves of the primary pulley 2 and the secondary pulley 3 is used as fixed flanges 2a, 3a, and other flanges are used as movable flanges 2b, 3b capable of being displaced in the axial direction. These movable flanges 2b, 3b are biased to the fixed flanges 2a, 3a by supplying a primary pulley pressure Ppri and a secondary pulley pressure Psec, which are obtained by using after-mentioned line pressure as an original pressure, to a primary pulley chamber 2c and a secondary pulley chamber 3c, whereby the V-belt 4 is frictionally engaged both between the fixed flange 2a and the movable flange 2b and between the fixed flange 3a and the movable flange 3b to enable the above-mentioned transmission of power between the primary pulley 2 and the secondary pulley 3.

This embodiment especially aims to miniaturize the size of V-belt type continuously variable transmission by equalizing a pressure receiving area of the primary pulley chamber 2c and that of the secondary pulley chamber 3c, thereby preventing one of the pulleys 2, 3 from having a larger diameter.

In a gear shift, differential pressure between the primary pulley pressure Ppri and the secondary pulley pressure Psec which are generated according to a target gear ratio changes width of the V-shaped grooves of the pulleys 2, 3, and a winding radius of the V-belt 4 with respect to these pulleys 2, 3 is continuously changed, whereby the target gear ratio can be realized.

Outputs of the primary pulley pressure Ppri and the secondary pulley pressure Psec are controlled by a shift control hydraulic circuit 11, together with outputs of engagement hydraulic pressures of the forward clutch 7b to be engaged at the time when a forward running range is selected and the backward brake 7c to be engaged at the time when a backward running range is selected. This shift control hydraulic circuit 11 performs this control in response to a signal from a transmission controller 12.

For the purpose, the transmission controller 12 receives a signal from a primary pulley rotation sensor 13 for detecting a primary pulley rotation speed Npri, a signal from a secondary pulley rotation sensor 14 for detecting a secondary pulley rotation speed Nsec, a signal from a secondary pulley pressure sensor 15 for detecting the secondary pulley pressure Psec, a signal from an accelerator opening sensor 16 for detecting an accelerator depression amount APO, a selected range signal from an inhibitor switch 17, a signal from an oil temperature sensor 18 for detecting a sift operation oil temperature TMP and signals concerning an engine torque information (engine rotation, fuel injection time or output torque information of engine) from an engine controller 19 for controlling the engine 5.

Moreover, the transmission controller 12 receives a signal from a primary pulley pressure sensor 30 for detecting the primary pulley pressure Ppri.

Figure 2:
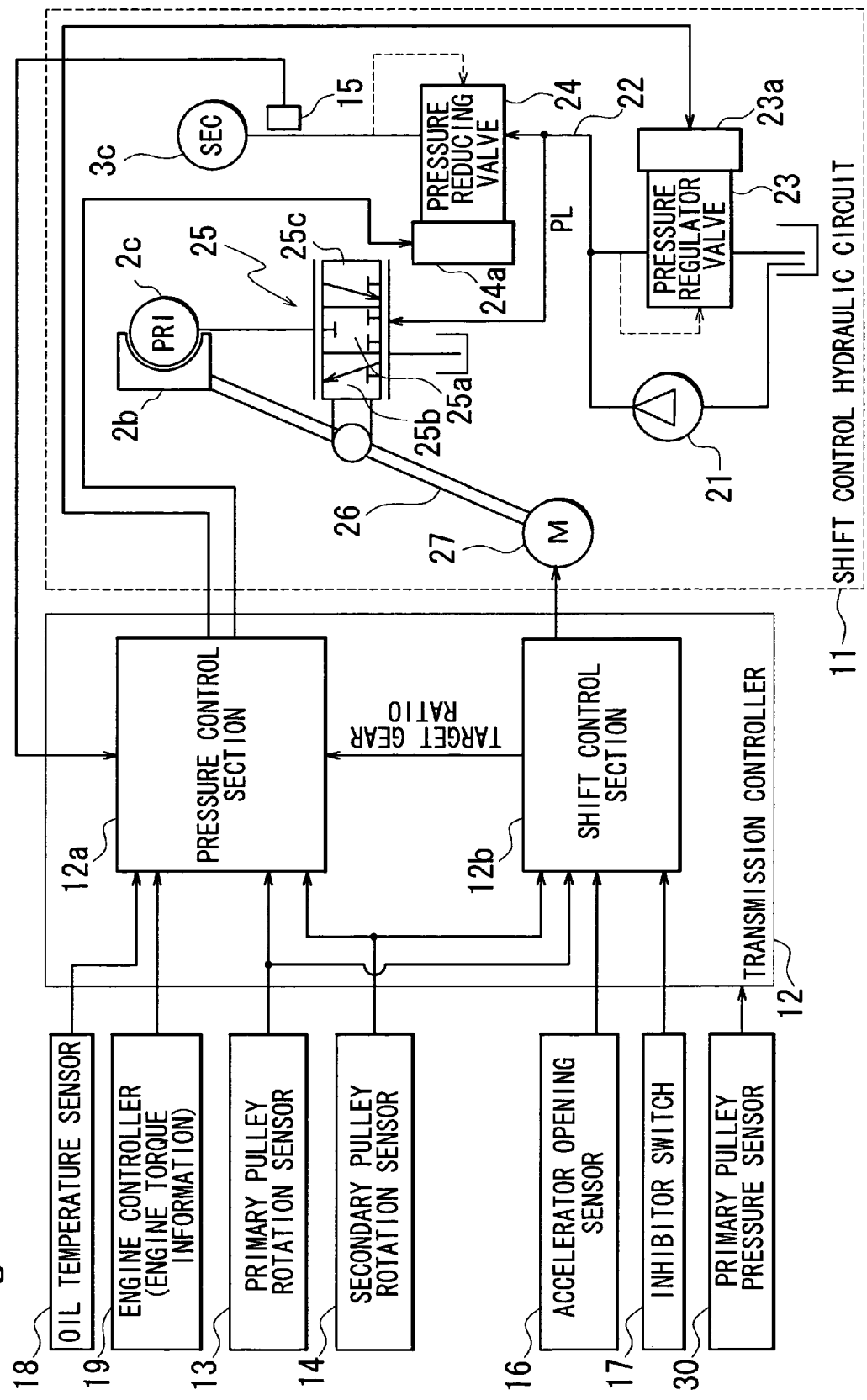
FIG. 2 is a view showing the detail of a shift control system of a V-belt type continuously variable transmission.

Next, controls performed in the shift control hydraulic circuit 11 and the transmission controller 12 will be explained with reference to FIG. 2.

The shift control hydraulic circuit 11 is provided with an oil pump 21 driven by the engine. The shift control hydraulic circuit 11 regulates the oil pressure generated by the oil pump 21 to a predetermined line pressure PL with a pressure regulator valve 23. The line pressure PL of the oil passage 22 is reduced by a pressure reducing valve 24 and supplied to the secondary pulley chamber (SEC) 3c as the secondary pulley pressure Psec on the one hand, and is regulated by a shift control valve 25 and supplied to the primary pulley chamber (PRI) 2c as the primary pulley pressure Ppri on the other hand. The pressure regulator valve 23 controls the line pressure PL with a drive duty applied to a solenoid 23a, and the pressure reducing valve 24 controls the secondary pulley pressure Psec with a drive duty applied to a solenoid 24a.

The shift control valve 25 has a neutral position 25a, a pressure increasing position 25b and a pressure reducing position 25c. The shift control valve 25 is connected to the middle of a shift link 26 to switch these valve positions. A step motor (M) 27 as a shift actuator is connected to one end of the shift link 26, the other end of which is connected to the movable flange 2b of the primary pulley. The step motor 27 is driven to an operating position advancing from a reference position by the number of step corresponding to a target gear ratio, and this driving of the step motor 27 causes the shift link 26 to swing with a portion connected to the movable flange 2b as a pivoting point, thereby switching the shift control valve 25 from the neutral position 25a to the pressure increasing position 25b or the pressure reducing position 25c.

As a result, when the target gear ratio is set at a high speed side (upshift side), the line pressure PL is brought into communication with a primary pulley pressure Ppri side, on the other hand, when the target gear ratio is set at a low speed side (downshift side), the primary pulley pressure Ppri is brought into communication with a drain side. Thereby, the primary pulley pressure Ppri is increased by using the line pressure PL as an original pressure or reduced by the drain to change differential pressure between the primary pulley pressure Ppri and the secondary pulley pressure Psec, so that an upshift to a Hi-side gear ratio or a downshift to a Lo-side gear ratio is established and thus, a shift operation toward the target gear ratio is performed.

Progress of the aforementioned gear shift is fed back to the shift link 26 through the movable flange 2b of the primary pulley, and the shift link 26 is displaced with the portion connecting with the step motor 27 as a pivot point in a direction where the shift control valve 25 is returned from the pressure increasing position 25b or the pressure reducing position 25c to the neutral position 25a. Thereby, when the target gear ratio is achieved, the shift control valve 25 is returned to the neutral position 25a, and the target gear ratio can be maintained. When the pulley is placed at the lowest position, capacity of transmission torque of the V-belt 4 can be retained since a not-shown mechanical stopper gives reaction force to the pulley regardless of presence or absence of the primary pulley pressure Ppri.

The transmission controller 12 determines a solenoid drive duty of the pressure regulator valve 23, a solenoid drive duty of the pressure reducing valve 24 and a shift command (step number) to the step motor 27, as well as controlling supply of engagement hydraulic pressure to the forward clutch 7b and the backward brake 7c which are shown in FIG. 1. This transmission controller 12 is constituted by a pressure control section 12a and a shift control section 12b as shown in FIG. 2. The pressure control section 12a determines a solenoid drive duty of the pressure regulator valve 23 and a solenoid drive duty of the pressure reducing valve 24, and the shift control section 12b determines a drive step number Astep of the step motor 27 as described below.

The shift control section 12b first determines a target input speed on the basis of a predetermined shift map by using a vehicle speed that can be determined from the secondary pulley rotation speed Nsec and an accelerator pedal depression amount APO, and determines a target gear ratio corresponding to driving states (vehicle speed and accelerator pedal depression amount APO) by dividing the target input speed by the secondary pulley rotation speed Nsec.

Next, the shift control section 12b calculates an actual gear ratio (achieved gear ratio) by dividing the primary pulley rotation speed Npri by the secondary pulley rotation speed Nsec and determines a gear ratio command for gradually bringing the actual gear ratio close to the target gear ratio at a target shift speed while carrying out disturbance compensation according to a difference between the actual gear ratio and the target gear ratio. Then, the shift control section 12b determines a step number Asetp of the step motor 27, that is, a operating position of the step motor 27, for realizing this gear ratio command and transmits this step number to the step motor 27, whereby the target gear ratio can be achieved with the aforementioned shift operation.

Next, process which the transmission controller 12 performs at the time of abnormal rise of gear ratio will be described.

Figure 3:
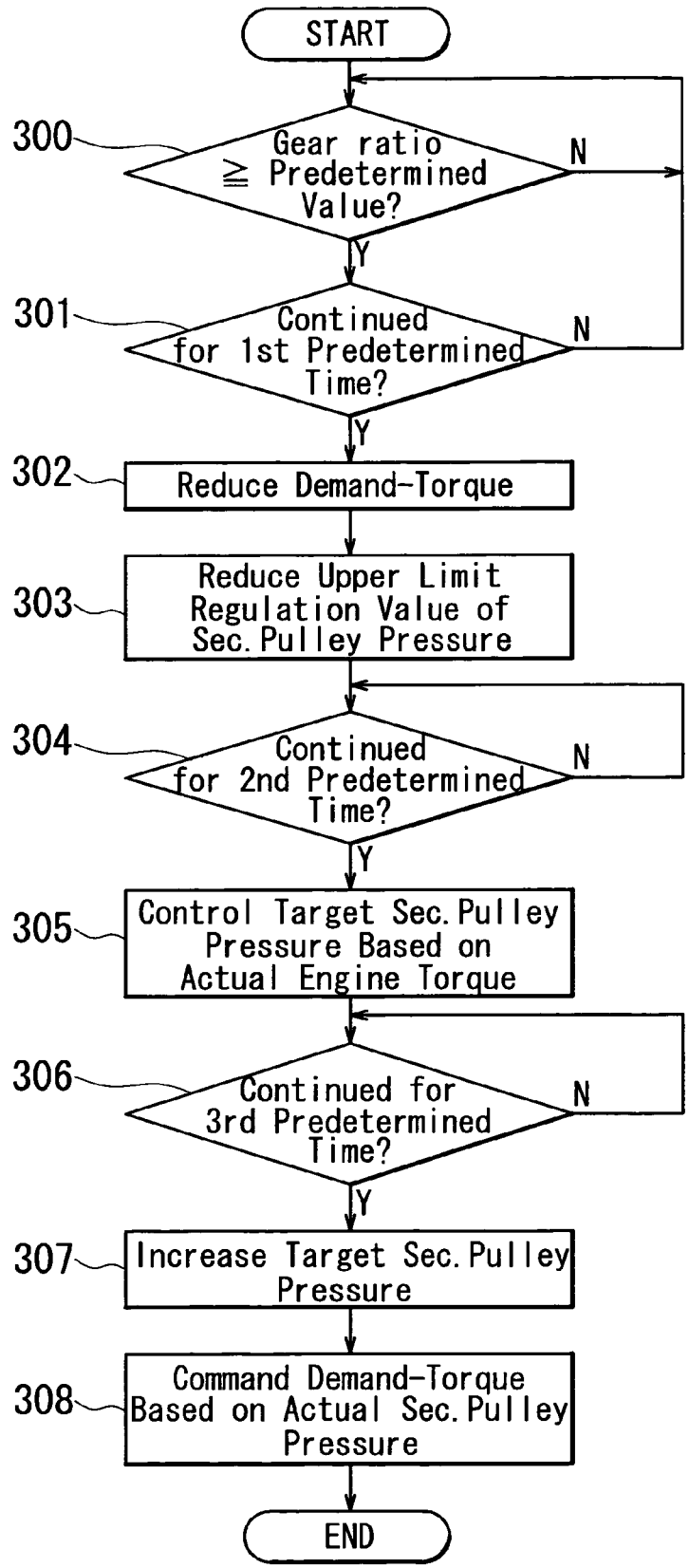
FIG. 3 is a flow chart showing a flow of a process which a transmission controller performs.
Figure 4:
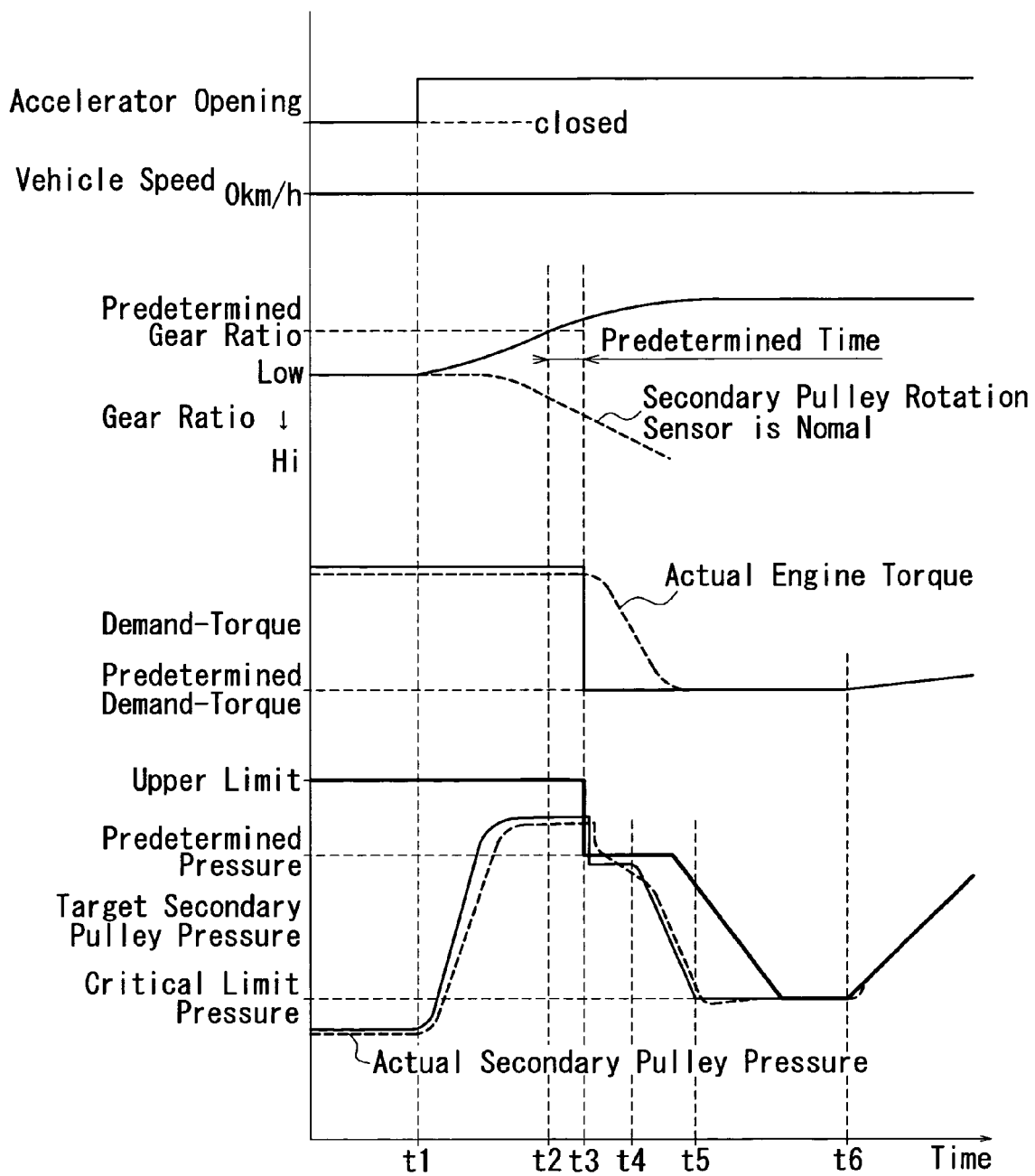
FIG. 4 is a time chart showing a change of a target secondary pulley pressure.

FIG. 3 is a flow chart showing a flow of process which the transmission controller 12 performs, and FIG. 4 is a time chart showing operation of each section in this control.

This process is started when an ignition switch is turned on.

When the accelerator is depressed by the driver at a time t1 after the ignition switch is turned on, as shown in FIG. 4, and an actual secondary pulley pressure shown by the broken line in FIG. 4 starts to increase.

When power from the engine is transmitted, and the primary pulley 2 starts to rotate, if the secondary pulley rotation sensor 14 fails or slip occurs in the V belt 4, only rotation speed of the primary pulley 2 is detected by the primary pulley rotation sensor 13.

Thereby, a gear ratio that is obtained by dividing rotation speed detected by the primary pulley rotation sensor 13 by rotation speed detected by the secondary pulley rotation sensor 14 is abnormally increased (changed to a low speed side) on and after the time t1 as shown by the solid line in FIG. 4.

In addition, when the secondary pulley rotation sensor 14 is normal, and no slip occurs in the V belt, the gear ratio is reduced (changed to a high speed side) as shown by the broken line in FIG. 4.

In a step 300, the transmission controller 12 determines whether a gear ratio that is calculated from results detected by the primary pulley rotation sensor 13 and the secondary pulley rotation sensor 14 becomes equal to or higher than a predetermined gear ratio.

When the gear ratio is abnormally increased to the predetermined gear ratio or higher (time t2 in FIG. 4), it is determined that the secondary pulley rotation sensor 14 fails or a slip occurs in the V belt, and the routine proceeds to a step 301.

On the other hand, when the gear ratio does not reach to the predetermined gear ratio, the process in the step 300 is repeated.

In the step 301, it is determined whether a state wherein the gear ratio is equal to higher than the predetermined value is continued for a first predetermined time or more. When this state is continued for the first predetermined time or more (time t3 in FIG. 4), the routine proceeds to a step 302, and when this state is not continued for the first predetermined time or more, the routine is returned to the step 300, and the above process is repeated.

In the step 302, the transmission controller 12 rapidly reduces a demand torque (shown by the solid line in FIG. 4) of the engine which is commanded to the engine controller 19 to a predetermined demand torque at the time t3 shown in FIG. 4.

The actual torque of the engine is reduced on and after the time t3 as shown by the broken line in FIG. 4.

In a step 303, the transmission controller 12 reduces an upper limit regulation value of the secondary pulley pressure to a predetermined pressure at the time t3 shown in FIG. 4.

Thereby, at the time t3, a target secondary pulley pressure is reduced to the predetermined pressure according to the upper limit regulation value of the secondary pulley pressure as shown by the solid line in FIG. 4.

In addition, the upper limit regulation value of the secondary pulley pressure is reduced to a later-described critical limit pressure at a predetermined gradient after a predetermined time elapses from the time t3.

In a step 304, the transmission controller 12 determines whether a second predetermined time or more elapses after upper limit of the target secondary pulley pressure is regulated to the predetermined pressure (from the time t3).

When the second predetermined time elapses, the routine proceeds to a step 305, and if not so, the process in the step 304 is repeated.

At a time t4 when the second predetermined time elapses after the upper limit of the target secondary pulley pressure is regulated to the predetermined pressure, in the step 305, the transmission controller 12 controls the secondary pulley pressure according to the actual engine torque.

In this control, the target secondary pulley pressure is controlled on the basis of an engine torque which is obtained from an engine torque relevant information which is inputted from the engine controller 19 to the transmission controller 12.

Thereby, on and after the time t4 shown in FIG. 4, the target secondary pulley pressure is reduced, and the actual secondary pulley pressure associated with this is reduced.

Moreover, when a slip actually occurs in V belt 4 at the time t3, the target secondary pulley pressure is reduced to a critical limit pressure that is capable of holding the V belt without causing slip in the belt. After the target secondary pulley pressure reduced to the critical limit pressure, and the target secondary pulley pressure is maintained at the critical limit pressure till a later-described time t6.

In addition, the aforementioned predetermined demand torque is set at a value that generates no slip in the V belt when the V belt is held by the critical limit pressure.

Thereby, when slip actually occurs in the V belt 4, the V belt can be held again without causing slip.

In a step 306, the transmission controller 12 determines whether a third predetermined time elapses from the time t3 when the upper limit of the secondary pulley pressure is regulated to the predetermined pressure. When the third predetermined time elapses, the routine proceeds to a step 307, and if not so, the process of the step 306 is repeated.

At the time t6 when the third predetermined time elapses from the time t3, in the step 307, the transmission controller 12 gradually increases the target secondary pulley pressure by increasing the upper limit regulation value of the secondary pulley pressure at a predetermined gradient.

In a step 308, the transmission controller 12 commands the demand torque of the engine according to the actual secondary pulley pressure to the engine controller 19.

This embodiment is thus constructed, and when gear ratio is abnormally increased due to the failure of the secondary pulley rotation sensor 14 or slip of the V belt 4, the transmission controller 12 rapidly reduces the demand torque of the engine and performs the upper limit regulation of the target secondary pulley pressure for the second predetermined time. And then the transmission controller 12 performs the control of the target secondary pulley pressure according to the output torque of the engine.

Thereby, when the secondary pulley rotation sensor 14 fails, since the actual torque of the engine does not exceed the belt capacity capable of holding the V belt by the secondary pulley pressure that is actually generated, no slip occurs in the V belt.

In addition, although the rotation speed of the primary pulley 2 is detected with the primary pulley rotation sensor 13 in this embodiment, this rotation speed can be also detected, for example, from the speed of the output shaft of the torque converter 6.

The rotation speed of the secondary pulley 3 can be also detected by means other than the secondary pulley rotation sensor 14.

Thereby, for example, even in the belt type continuously variable transmission in which the rotation speed of the primary pulley is detected not by the primary pulley rotation sensor but by the speed of the output shaft of the torque converter 6, the above hydraulic control can be performed without adding the primary pulley rotation sensor.

What is claimed is:

1. A hydraulic control system of a belt-type continuously variable transmission for a vehicle in which a belt is wound between a primary pulley to which power from an engine controlled by an engine controller is inputted and a secondary pulley of an output side, and a transmission controller calculates a target primary pulley pressure acting on the primary pulley and a target secondary pulley pressure acting on the secondary pulley so that an actual gear ratio of these pulleys which is obtained on the basis of a rotation speed of the primary pulley detected by a primary pulley side rotation detecting section and a rotation speed of the secondary pulley detected by a secondary pulley side rotation detecting section becomes a target gear ratio, wherein when the actual gear ratio is increased to a predetermined gear ratio or higher, the transmission controller commands reduction of an output torque of the engine to the engine controller and controls the target secondary pulley pressure to a value corresponding to the output torque of the engine after a predetermined time elapses from the command of the reduction of the output torque of the engine.

2. A hydraulic control system of a belt-type continuously variable transmission for a vehicle as claimed in claim 1, wherein the transmission controller limits the secondary pulley pressure by regulating an upper limit of the target secondary pulley pressure while the predetermined time elapses.

3. A hydraulic control system of a belt-type continuously variable transmission for a vehicle as claimed in claim 1 or 2, wherein the primary pulley side rotation detecting section includes a primary pulley rotation sensor directly detecting the rotation speed of the primary pulley, and the secondary pulley side rotation detecting section includes a secondary pulley rotation sensor directly detecting the rotation speed of the secondary pulley.

* * * * *